(12) United States Patent
Järvinen

(10) Patent No.: US 12,044,442 B2
(45) Date of Patent: Jul. 23, 2024

(54) SOLAR COLLECTOR, FASTENING MEMBER AND METHOD

(71) Applicant: SolarCleantec Oy, Äänekoski (FI)

(72) Inventor: Ari Järvinen, Jyväskylä (FI)

(73) Assignee: SolarCleantec Oy, Äänekoski (FI)

(*) Notice: Subject to any disclaimer, the term of this patent is extended or adjusted under 35 U.S.C. 154(b) by 569 days.

(21) Appl. No.: 17/359,808

(22) Filed: Jun. 28, 2021

(65) Prior Publication Data

US 2021/0404708 A1 Dec. 30, 2021

(30) Foreign Application Priority Data

Jun. 30, 2020 (FI) .................................. 20207113

(51) Int. Cl.
| | | |
|---|---|---|
| *F24S 25/636* | (2018.01) | |
| *F24S 10/50* | (2018.01) | |
| *F24S 25/67* | (2018.01) | |

(52) U.S. Cl.
CPC ............. *F24S 25/636* (2018.05); *F24S 10/50* (2018.05); *F24S 25/67* (2018.05)

(58) Field of Classification Search
CPC .. F24S 80/30; F24S 80/50; F24S 80/60; F24S 20/67; F24S 20/69; F24S 10/50; F24S 25/61; F24S 25/67; F24S 25/636; F24S 25/33; F24S 25/65
USPC ................................................. 126/623, 634
See application file for complete search history.

(56) References Cited

U.S. PATENT DOCUMENTS

| | | | | |
|---|---|---|---|---|
| 4,214,575 | A * | 7/1980 | Hopper ................... | F24S 80/70 |
| | | | | 126/704 |
| 4,559,924 | A * | 12/1985 | Wilhelm ................. | F24S 20/67 |
| | | | | 126/906 |
| 7,592,537 | B1 * | 9/2009 | West ....................... | F24S 25/61 |
| | | | | 136/251 |
| 9,745,754 | B1 * | 8/2017 | Narita ..................... | H02S 20/23 |
| 10,461,684 | B1 * | 10/2019 | Rubin ..................... | H02S 20/24 |
| 10,826,426 | B1 * | 11/2020 | Tyler ....................... | H02S 30/10 |
| 2013/0320166 | A1 * | 12/2013 | Kemple .................. | F24S 25/30 |
| | | | | 248/220.22 |
| 2014/0014164 | A1 * | 1/2014 | Song ....................... | H01L 31/02 |
| | | | | 403/294 |
| 2014/0223844 | A1 * | 8/2014 | Luo ......................... | E04D 13/00 |
| | | | | 52/173.3 |
| 2015/0101654 | A1 | 4/2015 | Pantel | |
| 2016/0305459 | A1 * | 10/2016 | Park ........................ | F24S 25/61 |
| 2017/0302222 | A1 | 10/2017 | Aliabadi | |
| 2018/0167026 | A1 * | 6/2018 | Xie ......................... | F24S 25/00 |
| 2018/0367088 | A1 * | 12/2018 | Tomlinson ............. | H02S 20/00 |
| 2019/0093925 | A1 * | 3/2019 | Laing ...................... | F24S 80/20 |
| 2019/0131918 | A1 * | 5/2019 | Kobayashi .............. | F16B 2/12 |

(Continued)

FOREIGN PATENT DOCUMENTS

JP 2002180605 6/2002

*Primary Examiner* — Ko-Wei Lin
(74) *Attorney, Agent, or Firm* — Katterle Nupp LLC

(57) ABSTRACT

A solar energy collector arrangement that includes a plurality of solar collectors arranged in at least two rows and at least two columns, and at least one fastening member. A fastening member in the middle of solar energy collector arrangement is configured to couple to four solar energy collectors around it, and fastening members in an edge area of the solar energy collector arrangement are configured to couple and align two solar energy collectors to each other.

14 Claims, 1 Drawing Sheet

(56) References Cited

U.S. PATENT DOCUMENTS

| | | | |
|---|---|---|---|
| 2019/0326851 A1* | 10/2019 | Wang | F24S 25/12 |
| 2020/0049378 A1* | 2/2020 | Markiewicz | F24S 25/636 |
| 2020/0059195 A1* | 2/2020 | Wang | H02S 20/20 |
| 2020/0064026 A1* | 2/2020 | Wang | F24S 80/00 |
| 2020/0119212 A1* | 4/2020 | Cui | F24S 25/61 |
| 2020/0266754 A1* | 8/2020 | Ferris | F24S 25/634 |
| 2020/0347865 A1* | 11/2020 | Yang | F24S 25/12 |
| 2020/0389121 A1* | 12/2020 | Stephan | E04D 3/361 |
| 2021/0249986 A1* | 8/2021 | Von Deylen | F16B 39/10 |
| 2021/0265938 A1* | 8/2021 | Van Giesen | E04D 3/32 |
| 2022/0224284 A1* | 7/2022 | Zimmermann | F24S 30/425 |

* cited by examiner

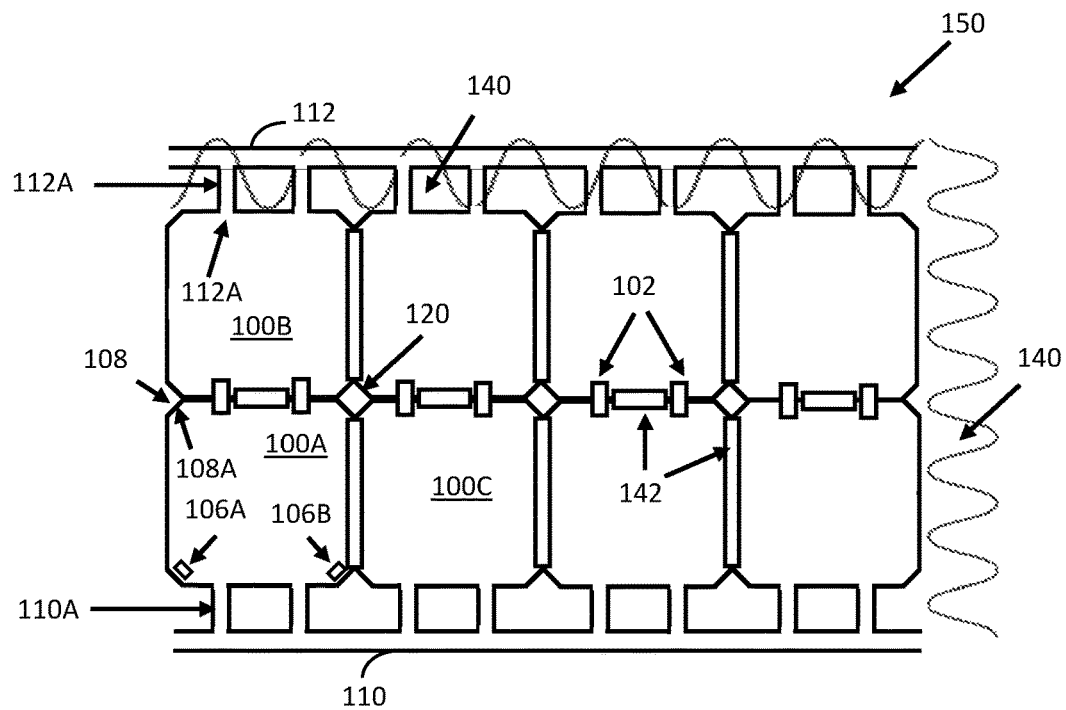
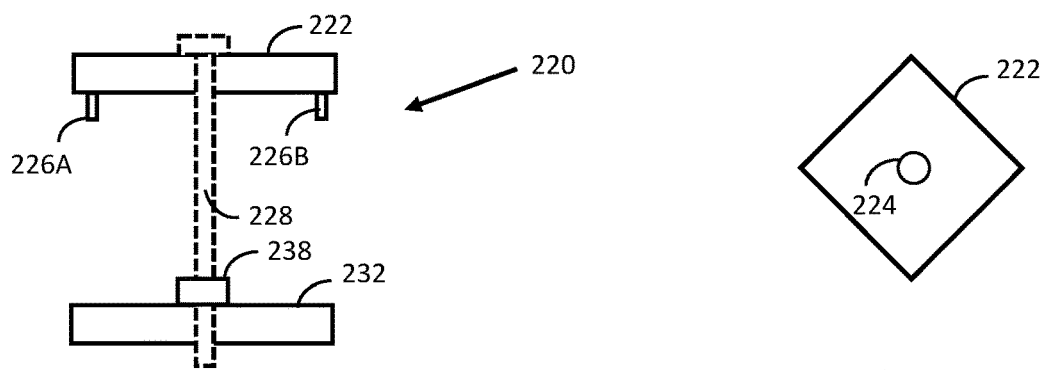
Fig. 2A
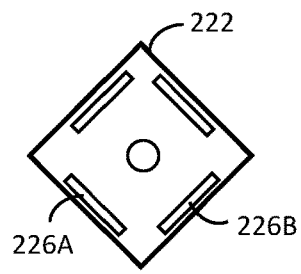
Fig. 2C
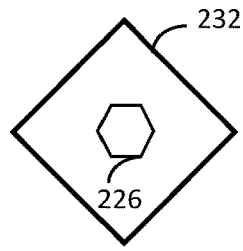
Fig. 2D

SOLAR COLLECTOR, FASTENING MEMBER AND METHOD

CROSS-REFERENCE TO RELATED APPLICATION

This patent application claims the benefit of priority under 35 U.S.C. § 119(a)-(d) to Finnish Patent Application No.: 20207113, filed on 30 Jun. 2020, which is incorporated herein by reference.

TECHNICAL FIELD

The disclosure relates to a solar thermal collector arrangement and assembly method.

BACKGROUND

Solar thermal collectors have existed for a long time and they have been for long mounted on roofs and walls of buildings. However, the known ways of mounting the collectors are inefficient in terms of output provided by the system and are also complicated in terms of the mounting process itself. There is thus a need for an improved structure of the solar collector system and need for an improved mounting process alleviate the above disadvantage.

SUMMARY

The disclosure is directed to providing an improved solar collector arrangement and a mounting process. The solar thermal collector arrangement and the method according to the invention provide a higher yield and efficiency than known collector systems, and its mounting to the target is substantially faster than known methods.

BRIEF DESCRIPTION OF THE DRAWINGS

The features, aspects, and advantages of the present disclosure will become better understood with regard to the following description, appended claims, and accompanying drawings where:

FIG. 1 shows an embodiment of a collector arrangement according to the disclosure;

FIG. 2A shows a top elevation of the fastening member;

FIG. 2B shows another top elevation of the fastening member;

FIG. 2C shows a bottom elevation of the fastening member; and

FIG. 2D shows a side elevation of the fastening member.

DETAILED DESCRIPTION OF ILLUSTRATIVE EMBODIMENTS

The embodiments relate to solar collectors and structures and a method for their attachment to a structure such as a building roof or a wall. Specifically, the embodiments relate to a structure of a solar collector and a fastening member.

Generally, collectors and/or panels are planar devices to be placed into sunlight and to collect solar energy contained in the sun radiation. Thermal collectors typically have a glass cover, and an air space beneath the glass cover. Under the air space the thermal collector has a front face to be placed to collect sunlight. Collecting of thermal energy may be enhanced by means of a black absorption surface. Beneath the front face, there is a collecting layer, where liquid or gas is contained to collect and circulate the received thermal energy to be provided for users of the thermal energy. In cold locations, the thermal collectors are often provided with an insulation layer below the fluid space to prevent the collected heat from escaping the collector. In the following, the embodiments are mainly explained with reference to thermal collectors, but it is appreciated that the embodiments are as well applicable also to solar panels or to systems where both ways of collecting solar energy are used. The term "collector" thus covers both thermal collectors collecting thermal energy and solar panels providing electric energy.

FIG. 1 shows one embodiment illustrating the invention by means of solar thermal collectors. The figure shows a 4*2 mounting group 150, thus including 4 vertical columns of collectors in 2 rows. Some other examples of mounting groups include 2*2, 3*4 or 4*6 collectors where the first digit indicates the number of columns, that is vertical rows, and the second digit the number of rows/levels, that is horizontal rows, of collectors. Depending on the mounting destination, there may be provided e.g. 1, 2, 3 or some other number of mounting groups that may be operatively connected to each other by providing fluid piping of electric cables between the mounting groups. The mounting groups may be arranged to the roof or the wall of a building, or to a mounting base arranged onto the ground or on water, for instance.

There are provided four columns of collectors being preferably identical to each other, arranged into two rows/layers. There is also provided a fluid input pipe 110 delivering cooled fluid into the collectors 100A to 100C and an output pipe 112 receiving the heated fluid from each row. There is also arranged in inlet, such as inlet 110A from the input pipe to the first column of collectors 100A, 100B, and an outlet 112A conveying the heated fluid from the first column of collectors to the output pipe 112. For transferring fluid from one row to another, there may be provided prefabricated connectors 102 in each collector to connect to the adjacent collector for delivering fluid or electricity from one collector to another. In case of fluid, the fluid thereby preferably runs through each column of collectors in from the inlet to the outlet in vertical direction. Preferably the number of collectors in each column is between two to four collectors in order the maximize the efficiency of the system.

As shown in exemplary embodiment of FIG. 1, each collector 100A to 100C has basically a shape of a square. In an exemplary embodiment, the size of the collector may be 1 m$^2$. Even though FIG. 1 illustrates the collectors as squares, they may also take other forms, such as rectangles.

Even though the general basic form of each collector 100A to 100C may be a square/rectangle, each collector is fabricated as having a void space in each corner. That is, to differentiate from the rectangular shape, the collector has a triangular void or blank space in at least one, preferably all corners of the collector. Thereby the basic/general form the collector is rectangular but the rectangular form is reduced by the corner regions have a cutouts/voids, e.g. in the form of triangle. In the exemplary embodiment as shown in FIG. 1, the void space or cutting may extend e.g. between 5 to 10 cm from the corner point if the collector had a square form. As the cutting preferably extends the same distance to horizontal and vertical direction, the cutting line is in 45-degree angle with respect to horizontal and vertical plane. Even though the cutting line has been illustrated as preferably being a straight line, the cutting line may take other forms too. In another embodiment, the cutting line may be a segment of a circle, for instance. Such an embodiment is, however, more difficult to manufacture and is thus only a suboptimal solution. Preferably the cutting is applied to all corners of the generally rectangular collector such that there are blank spaces, preferably identical to each other, in each corner of the collector.

As shown in FIG. 1, when four collectors are set adjacent to each other, a tilted square blank space or opening is formed at the junction of the four collectors of the voids of the collectors to which square a fastening member 102A according to embodiments is mounted to. Correspondingly, in the edge areas of set of the collectors, at the junction of two collectors the cuttings form a triangle, and the fastening member set to a junction of two collectors may be substantially a triangle or alternatively the square fastening member can also be applied at these regions.

Each collector has also coupling members for coupling the collector with the fastening member which is arranged to couple two or four collectors to each other. In FIG. 1, two such coupling members 106A and 106B are shown in adjacent corners for collector 100A. Practically the collector 100A, as all the other collectors, has similar coupling members in each corner of the collector. The coupling members are arranged to the proximity of the cutting line forming the blank space to the corner of the collector. In the most preferred embodiment, the coupling member is a recess in the collector on the inner side of the cutting line towards the center of the collector. In one embodiment, such a recess may be arranged on the top side being the sun receiving side of the collector and may be e.g. a 2-5 mm recess in the glass cover of the collector. In another embodiment, the recess is arranged on the underside of the collector, the underside being an opposite side compared to the topside of the collector. In a still further embodiment, both the top side that is visible in FIG. 1, and the bottom/underside of the collector comprise mentioned recesses.

In another embodiment, the coupling member is a through hole adjacent to the cutting on the inner side of the cutting line. In a still another embodiment, the coupling member is arranged to the cutting on the outer side surface of the collector. In such an embodiment, there may be provide a loop, for instance, for receiving a protrusion of a fastening member. In the simplest embodiment, the side surface of the collector at the cutting line facing towards the blank space operates as the coupling member for connecting to fastening member explained later in connection with FIG. 2.

FIG. 1 shows also an isolation arrangement 140 applicable in connection with the mounting group 150. The isolation, shown in FIG. 1 with wavelike line, is shown only on the right and top sides but similar isolation would also reside on left and bottom edges of the group of collectors. As the collectors are arranged side to side tightly close to each other, isolation is only needed on the edges of the mounting group in such a way that there will be isolation only on the outer edges of the collectors that reside on the edges of the mounting group. That is, in the exemplary mounting group of FIG. 1, the collector 100B would have isolation only on top and left sides, collector 100A only on left and bottom sides, and collector 100C only on its bottom side.

The isolation arrangement 140 may comprise a plurality of isolation elements that are connected to each other to together from the isolation arrangement. Associated with the solar collector 100B, the isolation element may comprise two perpendicular sides, one that is positioned vertically to the left in FIG. 1 and a perpendicular horizontally positioned side to be placed above collector 100B. Alternatively regarding collector 100B, the isolation may be provided by using two isolation elements, one of the vertical left side and one on the horizontal top side. Associated with the solar panel 100C, the isolation element in the form of a straight bar would only be placed below the isolation element.

One big advantage with the isolation elements is that they may be attached with the same fastening members as the collectors are attached to each other. That is, the collectors 100A and 100C may be attached to each other by a fastening member at the lower end of the collectors. Below the collector 100A, which resides at the edge of the group of collectors, there may be provided a first isolation element. Below the collector 100C, there may be provided a second isolation element. Thereby, the two collectors 100A and 100C, and the respective two isolation elements may all be attached by using a single fastening member. For this purpose, the isolation elements may be provided with similar voids and coupling elements as the collectors. In an embodiment, the isolation element has a metallic covering, and the coupling elements such as recesses or through holes may be formed to the metal covering.

In one embodiment, the isolation 140 may be isolation of the building. In such an embodiment, in a wall of the building there may be formed isolation on edges of the wall, and there is a recess in the isolation arranged to receive one or more mounting groups of collectors such that the isolation becomes to isolate the mounting group from the sides. Furthermore, when the mounting group is applied on a wall of the building, there may also be provided isolation in the wall in the area that resides behind the mounting group of solar collectors.

As can be seen in the figure, the output pipe 112 or heat transfer pipe is arranged within the isolation 140. In a preferred embodiment, there is provide a prefabricated channel within the isolation for receiving the liquid transfer pipe of electric cables. Thereby the channels are readily isolated being thus part of the compact mounting group. Mounting groups can also be placed next to each other and the isolation 140 of one mounting group can also house pipes/cables of adjacent mounting groups.

Within the isolation and the pipes arranged therein, there is also provided a quick connector for connecting to the connectors of the collectors. For instance, the pipe connector 110A that is within isolation (not shown) may be connected by a quick connector to the connector element of the collector 100A.

Between each two collectors, there is preferably provided a sealing 142. The small space between the collectors allows certain heat expansion of the collectors thus avoiding breakage of the collectors. The sealing arranged between vertical and/or horizontal junctions of the collectors is flexible and compressible thus allowing the heat expansion and still providing adequate sealing in various temperature conditions. The sealing also prevents air flow between the collectors thereby inducing the mounting group to operate as an isolator element.

FIGS. 2A to 2D show in more detail the structure of the fastening member 220 from different viewing angles.

FIG. 2A shows a side view of the whole fastening member 220. As the main constructional elements, the fastening member 220 may have a top plate 222 for fastening to the collectors, a bottom plate 232 for fastening to the structure such as building roof or wall and a fastener 228 such as a bolt or a screw for fixing the plates to their said respective elements. The bottom plate is an optional element as the bolt 228 can alternatively directly fasten to the wall of a building or to a rail or similar fixed to the building.

As can be seen from FIG. 2A, the top plate 222 has coupling elements 226A, 226B for fixing to the collectors. In an embodiment, the coupling elements are projections that project perpendicularly from the top plate 222. The longitudinal dimension of the projection may range from a couple of millimeters to some centimeters.

As shown in the figure, the coupling elements may be longitudinal projections to be inserted to respective recesses or other receiving elements such as loops in the thermal collectors or solar panels. In the simplest embodiment the projection sets to the opening 120 and sets against the side wall of the collector in the opening thereby aligning and defining the position of the collector to the other collectors.

In an embodiment there may also be provided certain spring-effect in the coupling elements such that they induce a spring force towards the center of the fastening member.

The important function that the coupling elements 226A, 226B is that they align the collectors exactly to desired position and distance with respect to each other. For instance, in the embodiment where the projections set to respective recesses on the top surface of the collector, the projections fix the collectors and prevent them moving the any direction. That may be provided e.g. by having the cross-section of the projection as rectangular which is received in a rectangular slightly bigger recess whereby all the walls of the recess set against and support the respective wall in the projection. The distances of the projections from each other define how far the collectors set from each other. It may be desired, for instance, that the collectors set to 4 mm distance from each other and by using the fastening member 220 all the collectors set exactly to 4 mm distance from each other providing for a high quality mounting of the collector group alleviating its mounting to a building wall, for instance. Another advantage from the exact alignment of the collectors to each other is that the prefabricated fluid connectors of each collector set exactly against respective fluid connectors of adjacent collectors whereby building of the whole collector groups becomes very convenient.

FIG. 2B shows the top plate 222 of the fastening member 220 as a top elevation, that is from a direction of the solar collector front face which is configured to receive sun radiation. Preferably the top plate is a planar plate. There is provided a through hole 224 in the top plate 222 for receiving the bolt or screw 228.

FIG. 2C shows the top plate 222 from the underside, that is, from the side that faces the roof or wall or similar.

It is seen that the top plate 222 comprises next to each side wall a coupling element 226A, 226B for connecting to a respective solar collector. The top plate 222 has four coupling elements whereby the fastening member is capable to fasten four solar collectors to each other. The coupling element, such as the coupling element 226A is adapted to be received by a recess or loop that is arranged to the solar collector. More specifically, each collector has a cutting, and the loop or recess is arranged in the solar collector to the vertical side wall of the cutting. In still another alternative embodiment, the counter element of the coupling element 226A is the side wall of the collector at the blank space.

In an embodiment where the coupling elements 226A, 226B are received in a recess, the coupling elements may be arranged at a small distance from the edge of the top plate. Thereby the top plate becomes to cover the whole opening, such as opening 120 in FIG. 1, between the solar energy collectors. In some embodiments, the top cover may extend e.g. 2 to 8 mm from the opening toward the inside of each collector when covering the opening. The top plate may be made of plastic, for instance, such that when it is tightened to close the opening between the collectors, it also presses against the collectors such that the juncture becomes air- and water-tight.

FIG. 2D shows the bottom plate 232, which operates a kind of counter-element to the top plate 222. The bottom plate 232 is arranged to set below the rail or similar structural element of the building. At the bottom plate, there is also arranged to counter-member 238 that has a threading for receiving the bolt 228 and thereby fixing the collectors to the structure. In an alternative embodiment, the bolt 228 may directly co-operate with the rail, and threading thereof to fasten the top plate 222 and associated solar energy collectors at a desired position tightly to the rail structure. Instead of the bolt-nut arrangement of FIG. 2A, the tightening of the plates 222, 232 with respect to each other may be arranged by means of quick-fastener such as a pivoting member, for instance. Such a pivoting member may be attached to the bottom plate and include a handle above plate 222, which when pivoted from vertical position to horizontal position against topside of plate 222, tightens these to each other.

FIGS. 2A to 2D show certain embodiments for providing the coupling elements at the fastening member but there are also other varieties. In one embodiment, the coupling members are arranged as projections on the bottom plate 232. That is, in FIG. 2A, instead of providing the coupling members on the underside of the plate 222, they may alternatively be provided on the topside of the plate 232 for entering into corresponding recesses on the underside of the solar collector. In a still further embodiment, the coupling elements such as 226A, 226B may be provided in both plates, underside of plate 222, and topside of plate 232.

The method according to the invention has the presumption that there are provided rails in the roof or wall for fixing the panels. Additionally, there is provided piping for incoming and outgoing fluid circulation in the case of solar thermal panels to be mounted to the structure.

In an embodiment according to the invention, first the lowest row of collectors are fixed to the rail by using a fastening member such as similar shown in FIGS. 2A to 2D. Alternatively, as the question is of the lowest row, there may be provided a fastening member having coupling elements on only two side walls of the fastening member. The fastening member may also be triangular in such case.

When the lowest row has been mounted, next the second level or column is mounted above the first row on the wall or roof. The liquid connector of a collector on the first level is connected to the liquid connector of an adjacent collector above the collector in the same column. Thereby the liquid can run in the collectors in the direction of the columns that being the advantageous direction due to heat rising upwards.

At the junction of four collectors, the fastening member is placed such that the male connecting elements of the fastening member are inserted to the female connecting elements of the collectors. There may also be provided a locking member for locking each of the connecting/coupling element of the fastening member to those of the collectors.

When all the collectors have been mounted to the structure, preferably the outer edges of the collector group are isolated with an isolator. In some preferred embodiments, the outer edge isolators may also include prefabricated piping or cabling for connecting the collectors to each other.

One advantage is that the group of tightly adjacent placed collectors form practically a single group of collectors and may even be arranged to cover the whole roof/wall, the mounting group reduce need for other construction materials generally needed for the roof/wall. The mounting group may also operate as an isolating layer in the building thereby partially or even completely avoiding the need for other isolation. The mounting group according to the embodiments reduces material needs in the building and therefore reduces the environmental impact and carbon footprint of the building/structure.

The fastening members and the fasteners may be arranged such that when the collectors are mounted to the structure, only a space of 2 to 8 mm is left between the collectors. This space may then be filled with transparent sealant which does not block sunlight entering the collectors and also by sealing the collectors form kind of a single unit having effective radiation collecting area close to 100% of the area. The embodiment where the collectors are sealed together, provides the significant advantage that there is no previously required isolation between the collectors, whereby also problems associated with wetting of the isolation can be avoided.

The fastening member according to the embodiments provides the significant advantage that the distances between the collectors can be precisely predetermined. Practically it can be said the collectors can be placed immediately adjacent to each other whereby the available area can be maximally utilized for collecting solar energy. Accordingly, the area needed to collect a certain amount of energy is minimized.

The tight assembly of the collectors to each other enables also using smaller collectors than previously, which small collectors are each for one person to handle. In the exemplary embodiments, the collectors have typically an area of approximately 1 m$^2$ ranging between 0.4 and 2 m$^2$.

The disclosure is not limited to the exemplary embodiments disclosed and shown in the drawing but can vary within the scope of the claims.

What is claimed is:

1. A solar energy collector for coupling to a fastening member, the solar energy collector having a generally rectangular shape and including a top surface, a bottom surface and a recess, wherein in at least one corner of the generally rectangular solar energy collector, there is a void defined by a cutting line such that the shape of the solar energy collector deviates from the rectangular shape in a corner region of the solar energy collector, wherein the recess is located in the proximity of the cutting line for coupling the solar energy collector to the fastening member, and wherein the recess is on the top surface and/or the bottom surface of the solar energy collector on an inner side of the cutting line.

2. The solar energy collector according to claim 1, wherein the solar energy collector further comprises side surfaces, wherein the top surface is arranged to be positioned to receive solar energy, and wherein the side surfaces are perpendicular to the top surface at edges of the solar energy collector.

3. The solar energy collector according to claim 1, wherein the solar energy collector further comprises side surfaces perpendicular to the top surface at edges of the of the solar energy collector, and wherein the cutting line comprises a straight line arranged at an angle with respect to the side surfaces of the solar energy collector, thereby defining the void as a triangle deviating the shape of the solar energy collector from a rectangular shape.

4. A combination comprising at least two solar energy collectors and a fastening member, wherein each of the at least two solar energy collectors has a generally rectangular shape and includes a coupling member, wherein in at least one corner of each of the at least two solar energy collectors, there is a void defined by a cutting line such that the shape of the solar energy collector deviates from the rectangular shape in a corner region of the solar energy collector, and wherein in each of the at least two solar energy collectors, the coupling member is located in the proximity of the cutting line for coupling the solar energy collector to the fastening member, and wherein the fastening member comprises a planar plate and at least two projections projecting from a surface of the planar plate, the at least two projections being received in the coupling members of the at least two solar energy collectors for coupling and aligning the at least two solar energy collectors to each other.

5. The combination according to claim 4, wherein the planar plate is a top plate, whose top surface is arranged to be placed towards sunlight, and the at least two projections are fixed to a bottom surface of the top plate.

6. The combination according to claim 4, wherein the planar plate comprises a top surface and four side surfaces perpendicular to the top surface, wherein the at least two projections comprise four projections, and wherein the fastening member has a projection disposed adjacent to each side surface.

7. The combination according to claim 4, wherein the planar plate has a hole through which a bolt extends.

8. The combination according to claim 7, wherein the bolt comprises a threading, wherein the fastening member further comprises a bottom plate having a threading that co-operates with the threading of the bolt, and wherein the bottom plate is arranged to secure the fastening member and the coupled solar energy collectors to a structure.

9. A solar energy collector arrangement comprising a plurality of the combinations according to claim 4, the solar energy collectors being arranged in at least two rows and at least two columns, wherein a center one of the fastening members is coupled to four of the solar energy collectors, which are disposed around the center one of the fastening members, and wherein outer ones of the fastening members are located in an edge area of the solar energy collector arrangement, the outer ones of the fastening members each coupling and aligning two of the solar energy collectors to each other.

10. The solar energy collector arrangement according to claim 9, wherein the solar energy collectors are arranged at 2 to 8 mm distance from each other when coupled to each other with the fastening members.

11. The solar energy collector arrangement according to claim 9, wherein the solar energy collector arrangement comprises sealant between the solar energy collectors to seal the spaces between the solar energy collectors from water and/or air passage.

12. The solar energy collector arrangement according to claim 9, wherein the solar energy collector arrangement comprises an isolation arrangement disposed around the solar energy collector arrangement, the isolation arrangement comprising a plurality of isolation elements, the isolation elements being attached to the solar energy collectors at their edges by some of the fastening members.

13. The solar energy collector arrangement according to claim 9, wherein the solar energy collectors are thermal energy collectors configured to collect solar radiation energy to heat fluid circulating in the solar energy collector arrangement, wherein each solar energy collector comprises a fluid connector that is coupled to the fluid connector of an adjacent solar energy collector or to a fluid connector of a heat transfer pipe conducting fluid to or from the solar energy collector arrangement.

14. A method of forming a solar energy collector arrangement, comprising:
providing a plurality of solar energy collectors, each of which has a generally rectangular shape and includes a coupling member, wherein in at least one corner of each of the plurality of solar energy collectors, there is a void defined by a cutting line such that the shape of the solar energy collector deviates from the rectangular shape in a corner region of the solar energy collector, and wherein in each of the plurality of solar energy collectors, the coupling member is located in the proximity of the cutting line;

providing at least one fastening member having a plurality of projections;

inserting one of the plurality of projections of the at least one fastening member into the coupling member of a first one of the plurality of solar energy collectors;

inserting another one of the plurality of projections of the at least one fastening member into the coupling member of a second one of the plurality of solar energy collectors; and securing the at least one fastening member to a structure;

wherein the inserting of the projections into the coupling members of the first and second ones of the solar energy collectors mechanically connects together the first and second ones of the solar energy collectors so as to be spaced apart a predetermined distance.

\* \* \* \* \*